March 19, 1968 G. T. BARLOW 3,374,357
SENSITIVITY REGULATOR FOR A PHOTOMULTIPLIER TUBE USING
MAGNETIC MODULATOR MEANS
Filed Aug. 26, 1965
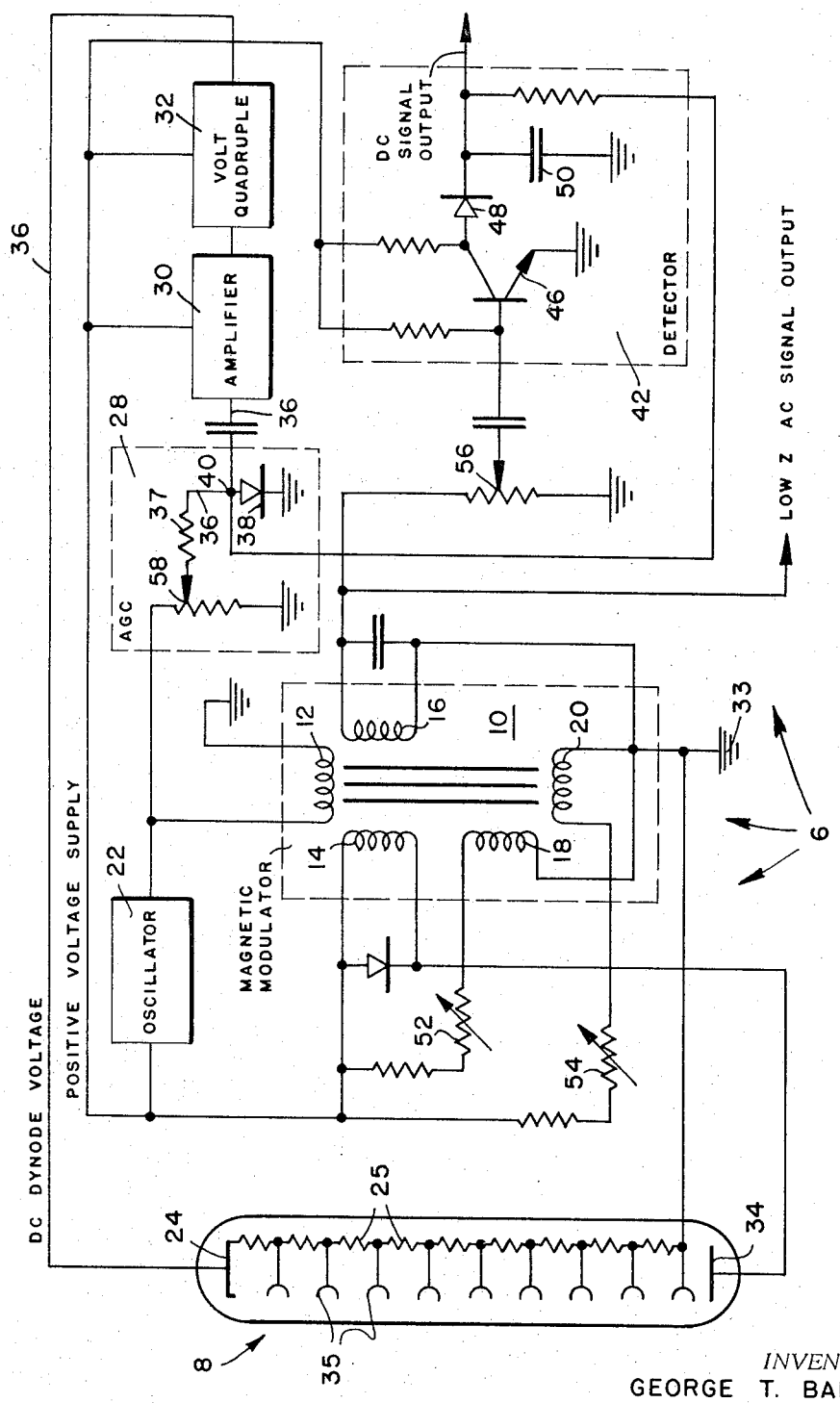
INVENTOR.
GEORGE T. BARLOW
BY
ATTORNEY.

3,374,357
SENSITIVITY REGULATOR FOR A PHOTOMULTI-
PLIER TUBE USING MAGNETIC MODULATOR
MEANS
George T. Barlow, San Diego, Calif., assignor, by mesne
assignments, to the United States of America as represented by the Secretary of the Navy
Filed Aug. 26, 1965, Ser. No. 482,951
6 Claims. (Cl. 250—207)

ABSTRACT OF THE DISCLOSURE

The description discloses a regulator for regulating the sensitivity of a photomultiplier tube so that the tube will be sensitive to light over a large range of intensity without damage to the tube. This may be accomplished by employing a magnetic modulator circuit which cooperates with a detector means and automatic gain control circuit to control an oscillator which drives the cathode and dynode string of the photomultiplier tube. The oscillator may have a constant frequency with a fixed output amplitude.

---

The invention described herein may be manufactured and used by or for the Government of the United States of America for governmental purposes without the payment of any royalties thereon or therefor.

The present invention relates to a sensitivity regulator for a photomultiplier tube and more particularly to such a simply constructed regulator which has improved stability and a greater dynamic light range.

Photomultiplier tubes which employ multiple dynodes are used extensively for the detection and measurement of very small amounts of light. The dynodes in combination with a voltage divider network provide a gain equal to the multiplication factor per stage to the $n$th power where the tube has $n$ dynodes.

Excessive light on the photomultiplier tube can quickly damage the efficiency of the cathode thereby requiring the tube to be replaced and recalibrated. In oceanographic work, where a photomultiplier tube is employed to measure ambient light or spontaneous light of plankton in the ocean, it is highly desirable that the tube be reliable so that costly operations will not be curtailed. Because of the large range of light conditions in oceanographic work a regulator is needed to protect the photomultiplier cathode from overloading as well as extending the range of the tube so that it can detect all light conditions expected to be encountered in the ocean. Still, for oceanographic work, it is desirable that the regulator be capable of calibration by a few minor adjustments.

The present invention provides a simple photomultiplier tube regulator which accomplishes the desired results set forth above. The regulator makes it possible to measure light over seven decades of intensity without the use of high impedance circuits. This may be accomplished by employing a magnetic modulator circuit which cooperates with a detector means and an automatic gain control circuit to control an oscillator which drives the cathode and dynode string of the photomultiplier tube, the oscillator being of a constant frequency and a fixed output amplitude. The magnetic modulator may have an AC excitation winding, a DC signal input winding and an AC signal output winding with the input winding adapted to sense the change in photomultiplier tube anode current as a result of a change in light on the cathode. The oscillator may be coupled to the excitation winding of the magnetic modulator in addition to driving the cathode and dynode string of the photomultiplier tube. The automatic gain control circuit may be coupled to the oscillator for controlling the oscillator output voltage, and the detector circuit may be coupled to the output signal winding of the magnetic modulator and to the automatic gain control circuit for controlling the gain of the automatic gain control circuit as an inverse function of the current on the anode of the photomultiplier tube. Such an arrangement enables the regulator to control the sensitivity of the tube (by controlling the dynode voltage) so that the tube will measure light over a large range of intensity without damage to the tube.

If desired the magnetic modulators may have null and bias windings with a means coupled to these windings to establish a starting point and linear operation of the modulator. In this manner the regulator can be set to operate in a linear fashion which is very desirable for oceanographic light measurement work. Further, the regulator may be greatly simplified by constructing the automatic gain control circuit with a diode to ground. The detector circuit will then act as a rectifier to convert the AC signal from the modulator to a DC signal so as to vary the impedance of the diode. This change of impedance will then automatically control the oscillator driving voltage to the cathode of the photomultiplier tube.

An object of the present invention is to provide a photomultiplier tube regulator which involves simple circuitry and is capable of controlling the tube over a large range of light intensity;

Other objects and many of the attendant advantages of the present invention will become readily understood and appreciated by reference to the following description and drawing wherein:

FIG. 1 is a schematic illustration of the regulator connected to a photomultiplier tube.

Referring now to the drawing there is shown in FIG. 1 a photomultiplier tube regulator 6 which is capable of regulating a photomultiplier tube 8 over a large range of intensity. The regulator 6 includes a magnetic modulator circuit 10 which has an AC excitation winding 12, a DC signal input winding 14, an AC signal output winding 16, a null adjustment winding 18 and a bias adjustment winding 20. The magnetic modulator 10 may consist of two permeable cores with each of the windings being wound about each core. Both cores are of the same material and are carefully matched to have the same magnetic characteristics. The bias winding 20 provides constant flux in each core, and the excitation winding 12 causes a flux variation proportional to this excitation current. Therefore, both cores are operating at about the same point on their respective magnetization curves and have flux variations which are substantially equal at all times. The signal winding 14 is wound so that its ampere-turns opposes the ampere-turns of the bias winding 20 in one core and aids the ampere-turns of the bias winding in the other core. When a signal is imposed, one core moves further into saturation and the other moves out of saturation. Because of the operation at different portions on the two curves there will be a net flux linking with the output winding 16 giving an output of the same frequency as the excitation winding 12. The magnetic modulator 10 is well known in the art and may be procured from General Magnetics, Inc.

An oscillator 22 is coupled to the excitation winding 12 of the modulator 10 for applying a desired frequency voltage thereto. The output of the oscillator 22 is also coupled to the cathode 24 and the top dynode of the string 25 of the photomultiplier tube 8 via an automatic gain control circuit 28, an amplifier 30 and a voltage quadrupler 32 to establish a DC dynode voltage. The bottom dynode is grounded at 33. It should be noted that the coupling of the output of the oscillator 22 to both the excitation winding 12 and the automatic gain control circuit 28 simplifies the circuitry considerably. The circuit is completed by the connection of the input signal winding 14 to the tube anode 34. It is the signal from this anode that is processed in the regulator 10 to regulate the photomultiplier tube 8.

The automatic gain control circuit 28, because of its coupling to the output of the oscillator 22, controls the oscillator driving voltage to the cathode 24 and the dynode string 25. The gain control circuit 28 may have a line 36 for carrying the oscillator drive voltage to the tube 8, a resistor 37 and a diode 38 which is connected in parallel with the oscillator driving voltage line 36. The resistor 37 and the diode 38 function as a voltage divider, the resistor being the high leg and the diode the low leg. Accordingly, any change in impedance of the diode 38 will cause a corresponding control of the driving voltage of the oscillator 22 at a point 40 along the driving voltage line 36.

The controlled AC driving voltage at point 40 is amplified in amplifier 30 and rectified and quadrupled to a DC voltage in quadrupler 32. The DC output of the quadrupler is then applied across the dynode string 25 and is called the dynode voltage.

A detector circuit means 41 is coupled to the output signal winding 16 of the magnetic modulator and to the automatic gain control circuit 28. The detector means is connected in parallel with respect to the diode 38 so as to control its impedance and thereby control the gain of the automatic gain control circuit 28. This gain will be an inverse function of the current on the anode 34 of the photomultiplier tube.

The detector 42 may have a transistor 46 for amplifying the AC signal from the output signal winding 16 and a diode 48 for converting the AC signal to a corresponding DC signal. It is then this DC signal which is applied to the gain control circuit 28 for varying the resistance of the diode 38, which signal will not alter the wave shape of the oscillator driving voltage on the line 36. The resistance of the diode 38 in turn controls the amplitude of the oscillator driving voltage which is fed to the amplifier 30. As shown, the detector utilizes a capacitor 50 in parallel with the diode 48 for filtering purposes.

As shown in FIG. 1 the null and bias windings 18 and 20 may be connected in series to respective rheostats 52 and 54 for respectively setting the null and bias settings of the magnetic modulator 10. The null winding 18 sets the starting point for the response of the regulator and the bias winding sets the operation along a linear portion of the response curve. In setting the null winding 18 the photomultiplier tube 8 is put in a darkened condition and the rheostat 52 is adjusted to give a minimum output at the modulator winding 16. The bias winding 20 is then adjusted through the rheostat 54 to establish a maximum signal output with the photomultiplier tube 8 subjected to a high light condition.

If desired a rheostat 56 may be connected between the output signal winding 16 and the detector 42 and a rheostat 58 may be connected between the oscillator 22 and the automatic gain control circuit 28. These rheostats 56 and 58 may be adjusted so as to calibrate the circuit.

In the operation of the circuit the sensitivity of the photomultiplier tube 8 is automatically controlled to accept a large dynamic light range by decreasing the dynode voltage (which decreases sensitivity of the tube) as light is increased on the cathode 24. With minimum or no light on cathode 24 the anode current flowing through the magnetic modulator signal winding 14 will be at minimum or zero. With minimum anode current the current through the null winding 18 should be adjusted for minimum AC signal out of magnetic modulator 10. This output signal at winding 16 is amplified by transistor 46 and rectified by diode 48 to produce a DC voltage to control the dynamic impedance of diode 38. With the above conditions the DC control voltage applied to diode 38 is low and the impedance of diode 38 is high.

The AC signal from the oscillator 22 is fed through the automatic gain control circuit 28. With no light as above, the impedance of diode 38 is at maximum and the signal on line 36 is at maximum. This signal after being aplified by amplifier 30 and rectified and quadrupled by volt quadrupler 32 becomes the DC dynode voltage and is impressed across the dynode string 25. This dynode voltage is now at its maximum and the photomultiplier tube 8 is at its maximum sensitivity.

Now when there is an increase in light there will be an increase in anode current flowing through the magnetic modulator control winding 14; an increase in the output signal winding 16; an increase in the DC control voltage across diode 38; a decrease in the impedance of diode 38; and a decrease in the signal on line 36. This results in a decrease in the dynode voltage and a decrease in photomultiplier tube sensitivity.

It is now readily apparent that the present photomultiplier tube regulator is a novel arrangement of circuitry which is much simpler and has improved operation.

Obviously many modifications and variations of the present invention are possible in the light of the above teachings. It is therefore to be understood that within the scope of the appended claims the invention may be practiced otherwise than as specifically described.

I claim:

1. A sensitivity regulator for a photomultiplier tube comprising:
   magnetic modulator means having excitation, and signal input and output windings, the input winding being adapted to sense the signal at the anode of the photomultiplier;
   an oscillator coupled to the excitation winding of the magnetic modulator and adapted to drive the cathode and dynode string of the photomultiplier tube;
   an automatic gain control circuit coupled to the oscillator for
   controlling the oscillator output voltage to said cathode and dynode string; and
   detector means coupled to the output signal winding of the magnetic modulator and to said automatic gain control circuit for controlling the gain of said automatic gain control circuit as an inverse function of the current on the anode of said photomultiplier tube;
   whereby an increase in light impinging upon the photomultiplier tube causes a decrease in the tube's sensitivity.

2. A sensitivity regulator as claimed in claim 1 including:
   means coupled to the automatic gain control circuit for rectifying the oscillator driving voltage to DC and feeding the rectified DC voltage to said dynode string.

3. A sensitivity regulator as claimed in claim 1 wherein the detector circuit includes:
   a rectifier for converting an alternating signal from the output signal winding of the magnetic modulator to a direct current signal.

4. A sensitivity regulator as claimed in claim 1 wherein the automatic gain control circuit includes:
   a line for carrying the oscillator driving voltage; and
   a diode connected in parallel with the oscillator driving voltage line and said detector circuit and capable of changing the dynamic impedance of the automatic gain control circuit as a function of the output of said detector circuit.

5. A sensitivity regulator as claimed in claim 4 wherein the detector circuit includes:

a rectifier for converting an alternating signal from the output signal winding of the magnetic modulator to a direct current signal.

6. A sensitivity regulator as claimed in claim 5 including:

means coupled to the automatic gain control circuit for rectifying the oscillator driving voltage to DC and feeding the rectified DC voltage to said dynode string.

References Cited

UNITED STATES PATENTS 2,454,169   11/1948   Haynes _____ 250—207

RALPH G. NILSON, *Primary Examiner.*

M. ABRAMSON, *Assistant Examiner.*